(12) United States Patent
Kuhles

(10) Patent No.: US 10,781,389 B2
(45) Date of Patent: Sep. 22, 2020

(54) SYSTEM FOR THE TREATMENT OF ORGANIC WASTE

(71) Applicant: GRENOL IP GMBH, Ratingen-Meiersberg (DE)

(72) Inventor: Alfons Kuhles, Ratingen-Meiersberg (DE)

(73) Assignee: GRENOL IP GMBH, Ratingen-Meiersberg (DE)

( * ) Notice: Subject to any disclaimer, the term of this patent is extended or adjusted under 35 U.S.C. 154(b) by 0 days.

(21) Appl. No.: 15/764,082

(22) PCT Filed: Sep. 20, 2016

(86) PCT No.: PCT/EP2016/072238
§ 371 (c)(1),
(2) Date: Mar. 28, 2018

(87) PCT Pub. No.: WO2017/055131
PCT Pub. Date: Apr. 6, 2017

(65) Prior Publication Data
US 2018/0282646 A1 Oct. 4, 2018

(30) Foreign Application Priority Data

Sep. 28, 2015 (DE) ................. 10 2015 116 366

(51) Int. Cl.
*C10L 5/44* (2006.01)
*C10L 9/08* (2006.01)
(Continued)

(52) U.S. Cl.
CPC .............. *C10L 5/44* (2013.01); *B01D 3/10* (2013.01); *C02F 1/046* (2013.01); *C02F 1/16* (2013.01); *C02F 3/327* (2013.01); *C02F 9/00* (2013.01); *C02F 11/122* (2013.01); *C02F 11/127* (2013.01); *C05C 3/00* (2013.01); *C10L 5/46* (2013.01); *C10L 9/086* (2013.01); *F02B 43/08* (2013.01); *C02F 2101/16* (2013.01); *C02F 2103/20* (2013.01); *C10L 2290/08* (2013.01);
(Continued)

(58) Field of Classification Search
CPC combination set(s) only.
See application file for complete search history.

(56) References Cited

U.S. PATENT DOCUMENTS 9,512,376 B2 12/2016 Peus
2011/0226603 A1 9/2011 Peus

FOREIGN PATENT DOCUMENTS

CN 103318918 9/2013
DE 102007012112 5/2008
(Continued)

OTHER PUBLICATIONS

Xiaotao, CN103318918 (A)—Method for purification and recovery of ammonia gas; Sep. 2013; google translated.*
(Continued)

*Primary Examiner* — Ellen M McAvoy
*Assistant Examiner* — Chantel L Graham
(74) *Attorney, Agent, or Firm* — Grossman, Tucker, Perreault & Pfleger, PLLC

(57) ABSTRACT

The present invention relates to a system for the treatment of organic waste and/or waste, particularly waste from biogas plants, slurry and the like, cut or green waste and/or sewage sludge.

18 Claims, 1 Drawing Sheet

(51) Int. Cl.

| | |
|---|---|
| *C10L 5/46* | (2006.01) |
| *C05C 3/00* | (2006.01) |
| *F02B 43/08* | (2006.01) |
| *C02F 11/12* | (2019.01) |
| *B01D 3/10* | (2006.01) |
| *C02F 1/04* | (2006.01) |
| *C02F 11/122* | (2019.01) |
| *C02F 11/127* | (2019.01) |
| *C02F 1/16* | (2006.01) |
| *C02F 3/32* | (2006.01) |
| *C02F 9/00* | (2006.01) |
| *C02F 103/20* | (2006.01) |
| *C02F 101/16* | (2006.01) |
| *F02B 63/04* | (2006.01) |

(52) U.S. Cl.
CPC ....... *C10L 2290/10* (2013.01); *C10L 2290/28* (2013.01); *C10L 2290/30* (2013.01); *C10L 2290/543* (2013.01); *C10L 2290/546* (2013.01); *C10L 2290/547* (2013.01); *F02B 63/04* (2013.01); *Y02E 50/10* (2013.01); *Y02E 50/14* (2013.01); *Y02E 50/30* (2013.01); *Y02P 20/129* (2015.11); *Y02T 10/16* (2013.01); *Y02W 10/18* (2015.05)

(56) References Cited

FOREIGN PATENT DOCUMENTS

| | | |
|---|---|---|
| DE | 102007062809 | 7/2008 |
| DE | 102009027007 | 12/2010 |
| DE | 102012024463 | 6/2014 |
| DE | 102013013724 | 2/2015 |
| WO | 2010/058377 | 5/2010 |

OTHER PUBLICATIONS

English translation of International Search Report from corresponding PCT Appln. No. PCT/EP2016/072238 dated Nov. 12, 2016.
English translation of Written Opinion from corresponding PCT Appln. No. PCT/EP2016/072238 dated Feb. 1, 2018.
English translatoin of Hemming, W., "Introduction: Nature and tasks of process engineering", Process Engineering, 7th revised and extended edition, 1993, s.9, 153, Germany.

* cited by examiner

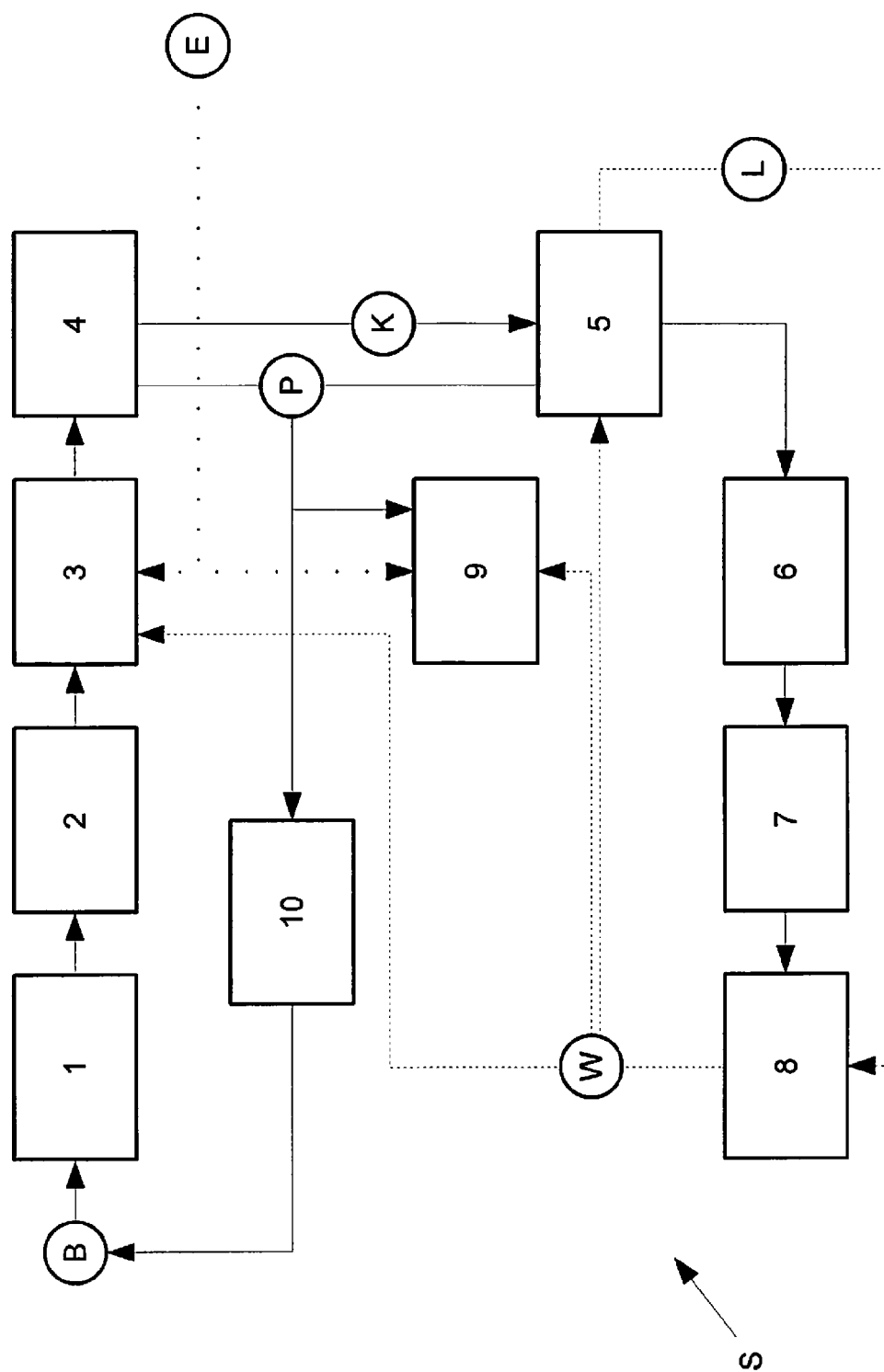

SYSTEM FOR THE TREATMENT OF ORGANIC WASTE

FIELD

The present invention relates to a system for the treatment of organic waste and/or waste material, particularly waste from biogas plants, slurry and the like, green waste and/or sewage sludge.

BACKGROUND

It is known from the state of the art to produce coal or gas from biomass respectively organic waste and/or waste materials in an easy manner by hydrothermal carbonization, thereby releasing energy. In this process, biomass is heated up with water in a pressure container, wherein dry biomass can be treated as well as wet biomass.

Within the pressure container that is filled with biomass, an exothermic reaction is executed, in which the carbon of the starting material is completely converted after several hours, thereby producing brown coal. In this physicochemical process, almost 100% of the carbon and two-thirds of the energy contained in the original biomass are preserved. There is no emission of climate-damaging $CO_2$ or methane.

As another product of the hydrothermal carbonization, the so-called HTC process water emerges which contains valuable nutrients for the growth of plants. This process water is for example used to produce large quantities of additional biomass within a short time period.

A disadvantage of the technology known from the state of the art is that the HTC process water is immediately used for acceleration of biomass growth and the possibilities for the complete usage of the total HTC process water resulting from the process of hydrothermal carbonization cannot be used economically profitable due to the size of the cultivated areas required for the growth of plants.

SUMMARY

In this light, the object of the present invention can be seen to be that of developing an improved system for the treatment of organic waste and/or waste materials, which improves the overall efficiency and also facilitates the usage of all reaction products resulting from the hydrothermal carbonization process as far as possible.

For a technical solution, the present invention provides a system for the treatment of organic waste and/or waste, particularly waste from biogas plants, slurry and the like, cut or green waste and/or sewage sludge, comprising an optional device for removal of impurities from the organic waste, an optional device for crushing the organic waste material which is arranged downstream the optional device for removal of impurities, a device for conversion of the organic waste into the processed products coal and process water using hydrothermal carbonization which is arranged downstream the optional device for removal of impurities and/or the optional device for crushing the organic waste material, a device for separation of the processed products coal and process water resulting from the hydrothermal carbonization, particularly a chamber filter press or a centrifuge, which is arranged downstream the device for conversion of the organic waste into the processed products coal and process water, a device for drying and optionally briquetting the coal obtained as a processed product, wherein a process water eventually resulting from the drying and optionally briquetting of the coal is conveyed to the process water obtained by the hydrothermal carbonization, wherein the device for drying and optionally briquetting the coal is arranged downwards the device for separation of the processed products coal and process water, and a device for an at least partial vacuum distillation of the process water obtained as a processed product by concentrating using negative pressure for the production of fertilizer which is arranged downstream the device for separation of the processed products coal and process water.

The invention is making use of the insight that a purification of the process water resulting from the process of hydrothermal carbonization can be accomplished by concentrating with negative pressure and hence a water purification using plants for which much space is needed, does not necessarily need to be implemented.

Moreover, the inventive solution of the objective technical problem has further advantages with regards to the transportation of the processed products of the hydrothermal carbonization process since the fertilizer obtained from the process of concentrating at negative pressure is much better transportable than the unprocessed process water.

According to an advantageous embodiment of the invention, a device for an at least partial conversion of the dried and optionally briquetted coal into a synthetic gas is provided, particularly a wood-/coal-gasifier, which is arranged downstream the device for drying and optionally briquetting the coal. The implementation of such a device is specifically possible when a source of energy in terms of a synthetic gas is required as a processed product. Furthermore, there are advantages concerning the manageability and transportation of synthetic gas as compared to coal.

Within a further advantageous embodiment of this invention, a device for utilization of the synthetic gas for the production of electrical energy using a generator, particularly a bi-fuel engine, is provided which is arranged downstream the device for an at least partial conversion of the dried and optionally briquetted coal into a synthetic gas. This enables a better distribution of the energy produced using the procedure of hydrothermal carbonization because available infrastructures can be used for the transportation of electrical energy. Hence, the inventive system can be used for the decentral production of electrical and thermal energy.

Moreover, an advantageous embodiment of the invention provides a device for storage respectively interim storage of the coal which is arranged between the device for drying and optionally briquetting the coal and the device for an at least partial conversion of the dried and optionally briquetted coal into a synthetic gas. This is advantageous under the condition that the device for the conversion of the dried and optionally briquetted coal into a synthetic gas is not large enough to carry out the conversion of coal into synthetic gas immediately and to meet various requirements to the supply of electrical and thermal energy. Preferably, the storage or interim storage is designed and built in such a way that it includes an apparatus for the automated transportation from the device from drying and optionally briquetting of the coal gained as processed product to the device for the conversion of the dried and optionally briquetted coal into a synthetic gas, using an automatic conveyor system, such that a manual intervention into the inventive system is obsolete.

In accordance with another advantageous design of this invention an exhaust air resulting from the device for the drying and optionally briquetting the coal is used as inlet air for the device for utilization of the synthetic gas for the production of electrical energy using a generator. Thus, the emission of climate damaging gases that may occur from the process of drying, because, for instance, phenols evaporating from the exhaust air in the engine of the device serving for the utilization of the synthetic gas as combustible. Thus, another purification of the exhaust air, respectively the emissions resulting from the exhaust air, is not necessary.

In another advantageous embodiment of this invention, a waste heat which is produced by the device for utilization of the synthetic gas for the production of electrical energy using a generator is used as a heat source for the device for an at least partial vacuum distillation of the process water and/or for the device for conversion of the organic waste into the processed products coal and process water using hydrothermal carbonization. By such a use of waste heat emerging from the process anyway, the energy balance of the inventive system can be increased. Consequently, a separate heat source for the device for the conversion of biomass waste by hydrothermal carbonization and/or the device for the partial or complete vacuum distillation of the process water obtained as processed product by concentrating by negative pressure is not necessary. Preferably, the waste heat produced by the usage of synthetic gas is used as a heat source for the device for drying and briquetting of the coal gained as processed product.

In an advantageous embodiment of this invention, the coal, which is not used by the device for an at least partial conversion of the dried and optionally briquetted coal into a synthetic gas, is provided for further usage outside of the inventive system. Such a usage can be the treatment of coal, by which, for instance, the coking of the coal or a liquefaction is conducted.

In another advantageous embodiment of the invention, the synthetic gas, which is not used by the device for utilization of the synthetic gas for the production of electrical energy using a generator, is provided for further usage outside of the inventive system. For instance, the synthetic gas not used within the invention can be bottled into glass bottles or gas containers which are suitable for marketization and distribution, thereafter.

Preferably, the device for conversion of the organic waste into the processed products coal and process water using hydrothermal carbonization comprises an apparatus for dispensing chemically bound minerals from the organic waste and keeping these minerals within the process water. This is particularly advantageous because, this way, the minerals contained within the process water are not processed further with the coal resulting from hydrothermal carbonization, but instead remain in the process water from which by the device for the vacuum distillation of the processed product process water, further downstream, a fertilizer can be produced by concentrating of the process water by negative pressure, which may serve the nutritional supply of plants.

In another especially advantageous embodiment of the invention it is provided that the device for an at least partial vacuum distillation of the process water obtained as a processed product by concentrating using negative pressure for the production of fertilizer comprises an apparatus for a vacuum distillation of a volatile ammonium contained in the process water and an apparatus for the subsequent mixing of the distilled ammonium with a suitable acid, particularly with a sulphuric acid, for the production of an ammonium sulphate usable as fertilizer. Thus, it is specifically possible to eliminate components of nitrate contained in the process water. Depending on the concentrating, all other minerals contained within the process water remain within the water with 3 to 5 percent by volume of the input material as a basic fertilizer within the solution, whereby these minerals can be the macronutrients phosphorus, potassium, calcium oxide and carbon, as well as the micronutrients magnesium, manganese, boric acid etc.

Within another advantageous embodiment of this invention, the device for an at least partial vacuum distillation of the process water obtained as a processed product by concentrating using negative pressure for the production of fertilizer comprises an apparatus for complete vaporization of the water contained in the process water for the production of a spreadable fertilizer. Such a way of proceeding is advantageous under the condition that a spreadable fertilizer is preferred, for instance for transportation, and if there is no possibility for local use of the distilled water.

In another advantageous embodiment of the inventive system, a waste heat introduced from an external source, particularly from a biogas plant without a heat concept, is used as an optional heat source for the device for an at least partial vacuum distillation and/or the device for conversion of the organic waste into the processed products coal and process water using hydrothermal carbonization. This way, it is enabled that negative energy balances, which may occur under certain circumstances, can be compensated with regard to the heat supply of the inventive system and to use the waste heat stemming from the biogas plant without heating concept in an efficient manner.

In another advantageous embodiment of the inventive system, the process water, which is not used by the device for an at least partial vacuum distillation, is utilized by a device using aquatic plants, preferably using a greenhouse with automatic harvest. This particularly makes sense under the condition that no other process water is required for the production of fertilizer and the process water respectively the nutrients contained in the process water shall be used in an energy efficient manner. By the usage of process water with aquatic plants, a water purification is conducted, whereby the $C_4$ water plants are particularly suitable for this purpose and by their growth, additional biomass is produced, which on the one hand takes $CO_2$ from the atmosphere, thus serves as a $CO_2$-sink, and on the other hand, may serve as input material for the inventive system, thus can be converted into energy.

BRIEF DESCRIPTION OF THE DRAWINGS

Further details, characteristics and advantages of the present invention are explained herein after, using the example of implementation as shown in the FIGURE.
It is shown in:
FIG. 1 is an inventive system for the processing of organic waste and/or waste in a block diagram.

DETAILED DESCRIPTION

FIG. 1 shows the inventive system 5 for the treatment of organic waste and/or waste B in a schematic block diagram. The system 5 includes a device 1 for removal of impurities from the organic waste B to which a biomass B is led in the form of organic waste or waste B. After the impurities have been eliminated or removed, the biomass is processed further to a device 2 for crushing the organic waste material B. The crushing serves for an accelerated further processing, thereafter. After the crushing of the organic waste/waste material B, in step 3 the conversion of the organic waste/waste material B into the processed products coal K and process water W by hydrothermal carbonization is conducted. At this time, the two processed products are provided to the inventive system 5 in the form of a watery coal sludge, such that a separation of these two processed products is required. Such a separation is conducted, next, right after the device 3 for the conversion of biomass by hydrothermal carbonization in the device 4 which serves the separation of the processed products coal K and process water W, resulting from hydrothermal carbonization. In this FIGURE, such a device 4 is implemented in the form of a chamber filter press or centrifuge, which are particularly suited for the separation.

For the coal, now further treated as an processed product within the inventive system, a device 5 is provided for drying and optionally briquetting the coal K obtained as a processed product, wherein a process water P eventually resulting from the drying and optionally briquetting of the coal K is conveyed to the process water P obtained by the hydrothermal carbonization. In the next step, the dried coal K is processed further, using a device 7 for an at least partial conversion of the dried and optionally briquetted coal K into a synthetic gas, wherein a device 6 may be optionally provided for storage respectively interim storage of the coal K. Such a device 6 makes particularly sense under the condition, that only a certain share of the coal will be processed further, while another share is marketed and distributed in unchanged form. The device 8 for utilization of the synthetic gas for the production of electrical energy using a generator, which is arranged downstream the device 7 for an at least partial conversion of the dried and optionally briquetted coal K into a synthetic gas is provided in the inventive system 5, because thus, electrical energy can be produced as a source of energy, under the condition, that the usage of coal K and/or synthetic gas is not desired. The exhaust air L resulting from the device 5 for drying and optionally briquetting the coal K is used as inlet air for the device 8 for utilization of the synthetic gas for the production of electrical energy using a generator because emissions contained within the exhaust air, for instance phenols, may serve as fuel for the engine.

The process water P produced within the inventive system 5 will be concentrated, using device 9 for an at least partial vacuum distillation of the process water P obtained as a processed product by concentrating using negative pressure for the production of fertilizer. For this purpose, the device 9 for an at least partial vacuum distillation of the process water P obtained as a processed product by concentrating using negative pressure for the production of fertilizer comprises an apparatus for a vacuum distillation of a volatile ammonium contained in the process water P and an apparatus for the subsequent mixing of the distilled ammonium with a suitable acid, particularly with a sulphuric acid, for the production of an ammonium sulphate usable as fertilizer. In addition, in this embodiment it is provided that the process water P which is not used by the device 9 for an at least partial vacuum distillation, is utilized by a device 10 using aquatic plants. Aquatic plants have the ability to process the nutrients, respectively minerals, contained in the process water P very well. Moreover, aquatic plants are suitable to serve as biomass B, which can be added to the inventive system 5 as input material.

For further improvement of the energy balance sheet of the inventive system 5, in this example for the implementation, it is provided that the waste heat W which is produced by the device 8 for utilization of the synthetic gas for the production of electrical energy using a generator is used as a heat source for the device 9 for an at least partial vacuum distillation of the process water P as well as for the device 3 for conversion of the organic waste B into the processed products coal K and process water P using hydrothermal carbonization.

Moreover, it is provided in the inventive system 5, according to the given embodiment, that a waste heat E introduced from an external source, particularly from a biogas plant without a heat concept, is used as an optional heat source for the device 3 for conversion of the organic waste B into the processed products coal K and process water P using hydrothermal carbonization and/or the device 9 for an at least partial vacuum distillation. Thus, a deficit of exhaust heat which might occur within the inventive system 5 can be compensated. In addition, the surplus waste heat E from the biogas plant without heat concept can be used wisely.

The examples of the embodiment presented in the FIGURE and the examples explained in this context only serve for an explanation of the invention and are not restrictive for the same.

REFERENCE SIGNS

1 Device for removal of impurities from the organic waste (B)
2 Device for crushing the organic waste material (B)
3 Device for conversion of the organic waste (B) into the processed products coal K and process water (P) using hydrothermal carbonization
4 Device for separation of the processed products coal (K) and process water (P) resulting from the hydrothermal carbonization
5 Device for drying and optionally briquetting the coal (K) obtained as a processed product
6 Device for storage respectively interim storage of the coal (K)
7 Device for an at least partial conversion of the dried and optionally briquetted coal (K) into a synthetic gas
8 Device for utilization of the synthetic gas for the production of electrical energy using a generator
9 Device for an at least partial vacuum distillation of the process water (P) obtained as a processed product by concentrating using negative pressure for the production of fertilizer
10 Device for the at least partial usage of the process water (P) with aquatic plants.
B Biomass in the form of organic waste and/or waste (B)
E Supply with exhaust heat (E) from external source
K Coal
L Exhaust air resulting from the device (5) for drying and briquetting of the coal (K) obtained as processed product
P Process water
S System for the treatment of organic waste and/or waste (B)
W Waste heat produced by the device (8) for utilization of the synthetic gas for the production of electrical energy using a generator

What is claimed is:
1. A system configured to treat organic waste, comprising:
a device configured to remove impurities from the organic waste;
a device configured to crush the organic waste which is arranged downstream the device configured to remove impurities from the organic waste;
a device configured to convert the organic waste into processed products coal and process water by hydrothermal carbonization, which is arranged downstream of the device configured to remove impurities from the organic waste and/or the device configured to crush the organic waste;

a device configured to separate the processed products coal and process water resulting from the hydrothermal carbonization, which is arranged downstream the device configured to convert the organic waste into the processed products coal and process water, wherein the device configured to separate the processed products coal and process water resulting from the hydrothermal carbonization comprises a chamber filter press or a centrifuge;

a device configured to dry the processed products coal;

an automatic conveyor system configured to convey further process water from the drying of the processed products coal to the process water of the hydrothermal carbonization, wherein the device configured to dry the processed products coal is arranged downstream the device configured to separate of the processed products coal and process water; and a device configured to perform at least a partial vacuum distillation of the process water by concentrating using negative pressure to produce fertilizer, which is arranged downstream the device configured to separate the processed products coal and process water, which comprises an apparatus configured to perform a vacuum distillation of a volatile ammonium contained in the process water and an apparatus configured to subsequently mix the distilled ammonium with a sulphuric acid to produce an ammonium sulphate usable as fertilizer.

2. The system according to claim 1, further comprising a device configured to at least partially convert the dried processed products coal into a synthetic gas which is arranged downstream the device that is configured to dry the processed products coal.

3. The system according to claim 2, further comprising a device configured to utilize the synthetic gas to produce electrical energy using a generator which is arranged downstream the device configured to at least partially convert the dried processed products coal into a synthetic gas.

4. The system according to claim 3, comprising a device configured to store the processed products coal which is arranged between the device configured to dry the processed products coal and the device configured to at least partially convert the dried coal into a synthetic gas.

5. The system according to claim 3, wherein the device configured to dry the processed products coal is further configured to provide an exhaust air as inlet air for the device configured to utilize the synthetic gas to produce electrical energy using a generator.

6. The system according to claim 3, wherein the device configured to utilize the synthetic gas to produce electrical energy using a generator is further configured to provide a produced waste heat serving as a heat source to the device configured to perform at least a partial vacuum distillation of the process water and/or the device configured to convert the organic waste into the processed products coal and process water by hydrothermal carbonization.

7. The system according to claim 3, wherein the device configured to at least partially convert the dried processed products coal into a synthetic gas is further configured to provide unused processed products coal outside of the system.

8. The system according to claim 3, wherein the device configured to utilize the synthetic gas to produce electrical energy using a generator is further configured to provide unused synthetic gas outside of the system.

9. The system according to claim 1, wherein the device configured to convert the organic waste into the processed products coal and process water by hydrothermal carbonization comprises an apparatus configured to dispense chemically bound minerals from the organic waste and to keep the chemical bound minerals within the process water.

10. The system according to claim 1, wherein the device configured to perform at least a partial vacuum distillation of the process water by concentrating using negative pressure to produce fertilizer comprises an apparatus configured to completely vaporize water contained of the process water to produce a spreadable fertilizer.

11. The system according to claim 1, wherein the device configured to perform at least a partial vacuum distillation and/or the device configured to convert the organic waste into the processed products coal and process water by hydrothermal carbonization is further configured to receive a waste heat from an external source as a heat source.

12. The system according to claim 1, wherein the device configured to perform at least a partial vacuum distillation, is further configured to provide unused process water to utilize a device using aquatic plants.

13. The system according to claim 1, wherein the device configured to convert the organic waste into processed products coal and process water by hydrothermal carbonization is arranged downstream of the device configured to crush the organic waste.

14. The system according to claim 3, wherein the device configured to at least partially convert the dried processed products coal into a synthetic gas comprises a wood-/coal-gasifier; and the device configured to utilize the synthetic gas to produce electrical energy using a generator, comprises a bi-fuel engine.

15. The system according to claim 1, wherein the organic waste comprises waste from at least one biogas plant.

16. The system according to claim 1, wherein the organic waste comprises cut or green waste.

17. The system according to claim 1, wherein the organic waste comprises sewage sludge.

18. A system configured to treat organic waste, comprising:

an impurities removing device which removes impurities from the organic waste;

a crushing device which crushes the organic waste, which is arranged downstream the impurities removing device;

a converting device which converts the organic waste into processed products coal and process water by hydrothermal carbonization, which is arranged downstream of the impurities removing device and/or the crushing device;

a separating device which separates the processed products coal and process water resulting from the hydrothermal carbonization, which is arranged downstream the converting device, wherein the separating device comprises a chamber filter press or a centrifuge;

a drying device which dries the processed products coal;

an automatic conveyor system which conveys further process water from the drying of the processed products coal to the process water of the hydrothermal carbonization, wherein the drying device is arranged downstream the separating device; and a vacuum distillation device which performs at least a partial vacuum distillation of the process water by concentrating using negative pressure to produce fertilizer, which is arranged downstream the separating device, which comprises an apparatus which performs a vacuum distillation of a volatile ammonium contained in the process water and an apparatus which subsequently mixes the distilled ammonium with a sulphuric acid to produce an ammonium sulphate usable as fertilizer.

\* \* \* \* \*